United States Patent

[11] 3,596,591

[72] Inventor William A. Spates
     Beloit, Wis.
[21] Appl. No. 857,043
[22] Filed Sept. 11, 1969
[45] Patented Aug. 3, 1971
[73] Assignee Louis A. M. Phelan
     Pompano Beach, Fla.

[54] FOOD BROILER HAVING COMBINED SLIDEABLE FOOD RACK, DOOR AND DRIP PAN
19 Claims, 7 Drawing Figs.

[52] U.S. Cl. .................................................. 99/392,
     99/399, 99/400, 99/446, 126/41
[51] Int. Cl. ............................................... A47j 37/06
[50] Field of Search ........................................ 99/400,
     444, 445, 446, 355; 126/14, 41; 99/447, 448, 449,
     450, 375, 425, 392

[56] References Cited
UNITED STATES PATENTS
706,502  8/1902  VanWie .......................  99/400 X
2,180,868  11/1939  Dunning et al. ...............  99/444
3,413,911  12/1968  Phelan et al. .................  99/355
3,413,912  12/1968  Phelan et al. .................  99/400

Primary Examiner—William I. Price
Assistant Examiner—Philip R. Coe
Attorney—James E. Nilles ABSTRACT: Food broiling apparatus of the type utilizing a side-loading broiling chamber through which a rack containing the food to be broiled is slid into and out of the broiling chamber. A door is attached to one end of the rack, which door fully closes the side opening and when the rack is fully in the broiler chamber; a downwardly extending drip pan is attached to the door and is pivoted for swinging movement so that regardless of the extent to which the rack is pulled out of the broiling chamber the drip pan is located under the rack so as to catch any drippings therefrom. The discharge end of the drip pan moves only in a generally vertical direction so that it is always located over a lower receptacle into which the drippings can drain. Thus, a combined removable rack, door and swingable drip pan are provided for a side-loading-type broiler.

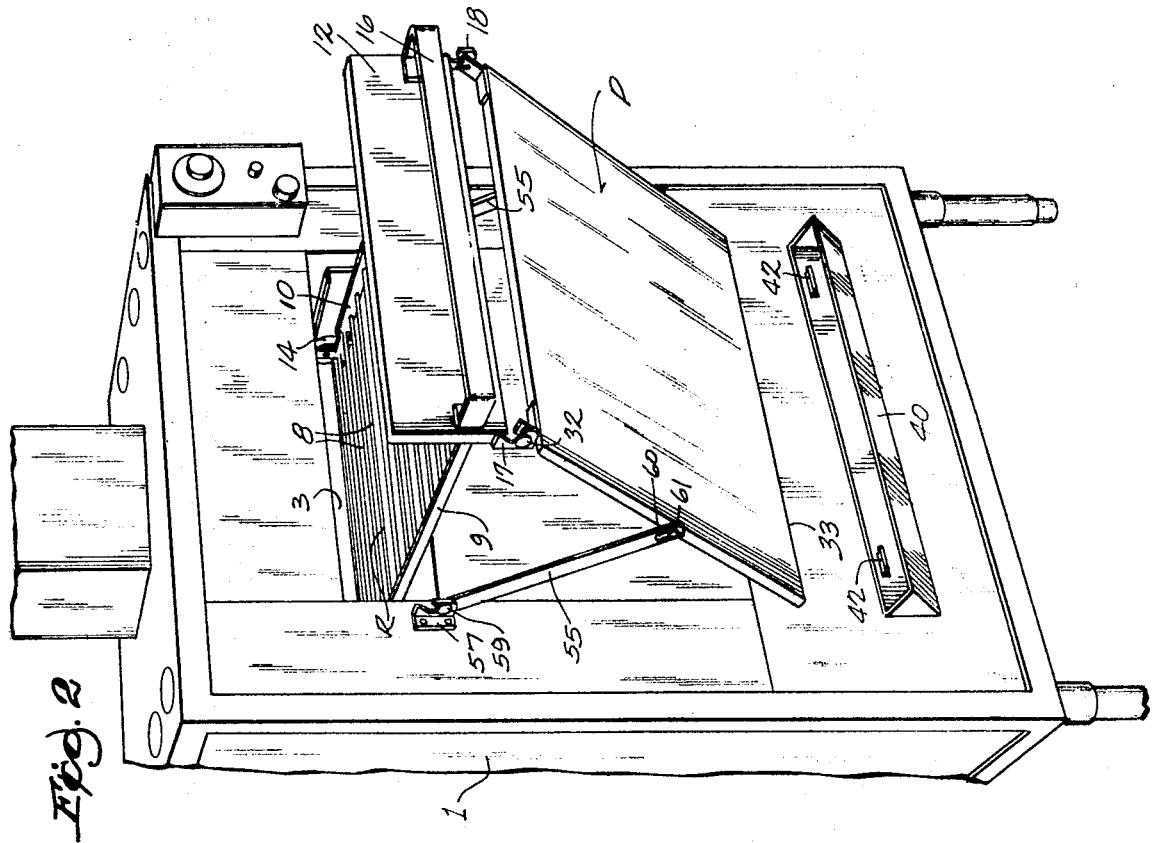
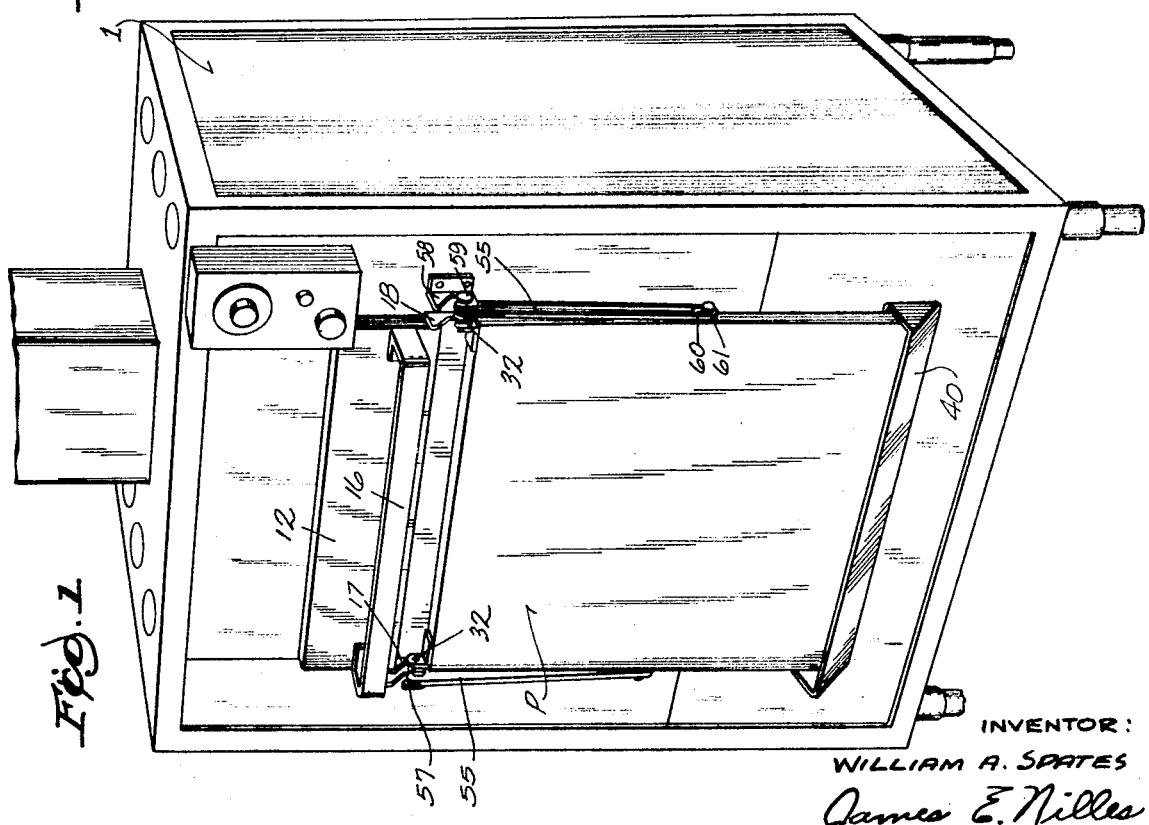

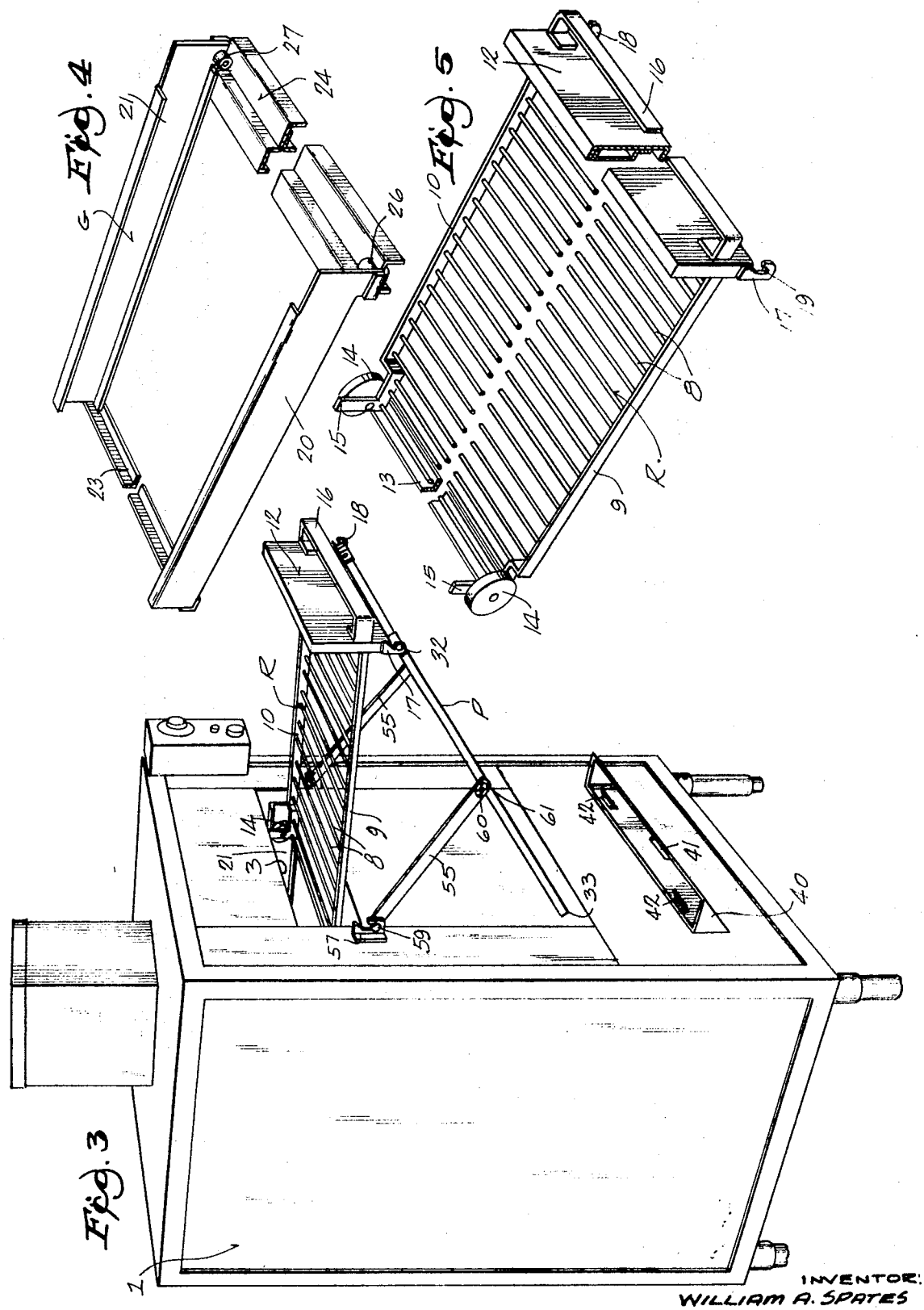

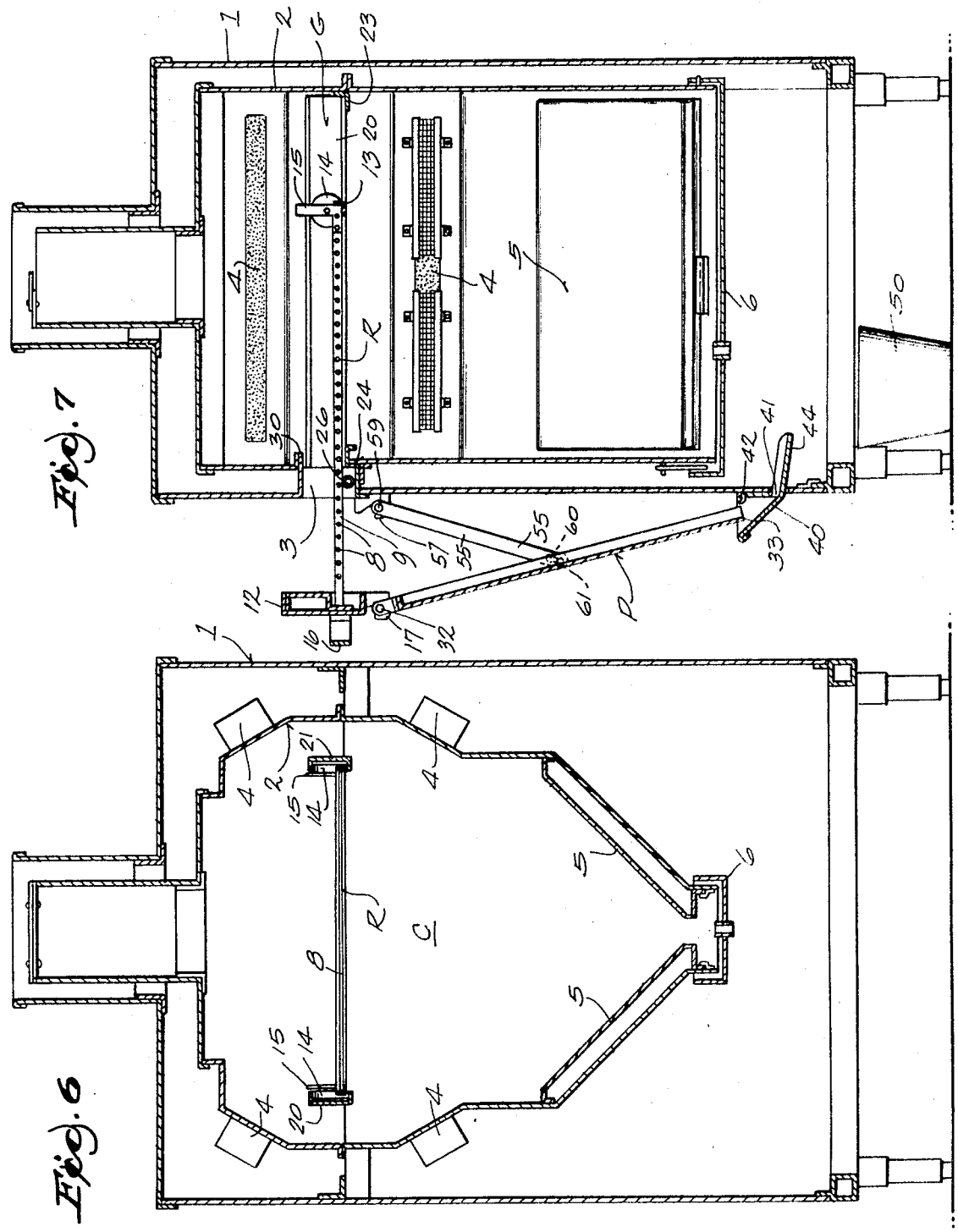

FOOD BROILER HAVING COMBINED SLIDEABLE FOOD RACK, DOOR AND DRIP PAN

BACKGROUND OF THE INVENTION

This invention pertains to food-handling apparatus, such as for example, broilers of the type utilizing heating units located above and below the food in the broiling chamber, and which also utilizes a side-loading opening through which the rack containing the food is moved in and out of the broiling chamber.

Side-loading broiler units of the type having heating units both above and below the food being cooked are old and well known. An example of such a unit is shown in the U.S. Pat. No. 2,355,230 issued Aug. 8, 1944 to Moecker, Jr., et al. for "Broiler Unit" in which gas-fired heating units are located above and below the food, the lower units being inclined at an angle and located beneath and at each side of the rack containing the food so that the fat does not drip on the lower heating units. Another example of such a unit is shown in the Mergen U.S. Pat. No. 2,848,592 issued Aug. 19, 1958 in which electrical heating units are positioned above and below the food in the broiling chamber and in addition, these units are adjustable relative to the food. Another example of a broiler having a combined door and rack is shown in the U.S. Pat. No. 2,649,085 of Aug. 18, 1953.

The present invention utilizes infrared, ceramic mat burners of the gas-fired type, and such burners are conventional and fully described in the U.S. Pat. to Phelan et al., No. 2,997,941 of Aug. 29, 1961. Burners of this type are also shown, above and below the food rack in the broiling chamber of the U.S. Pat. No. 3,267,924 of Aug. 23, 1966, which issued to Payne.

SUMMARY OF THE PRESENT INVENTION

The present invention provides a side-loading food broiler having a horizontally slideable rack which moves through the side opening into and out of the broiling chamber. The outer edge of the rack has a door attached thereto so that when the door is pulled open in a horizontal direction, the rack moves outwardly of the broiling chamber along with the door. Extending downwardly from the door is a drip pan coextensible in width with the rack, and this pan is mounted for swinging movement so that when the door is pulled outwardly, the drip pan is always located under the rack to catch any drippings. Furthermore, the lower edge of the drip pan moves in a generally vertical direction as the door moves in a horizontal direction, thereby ensuring that the drippings from the pan are collected in a receptacle located below the opening of the chamber. When the door is closed, the drip pan is positioned snugly against the front of the broiling unit.

These and other objects and advantages of the present invention will appear hereinafter as this disclosure progresses, reference being made to the accompanying drawings.

BRIEF DESCRIPTION OF THE DRAWINGS

FIG. 1 is a perspective view of a food broiler embodying the present invention, showing the door in the fully closed position;

FIG. 2 is a perspective view of the broiler shown in FIG. 1, but with the door and rack in a partially open position;

FIG. 3 is a view somewhat similar to FIG. 2, but showing the door and rack pulled further outwardly;

FIG. 4 is a perspective view, partially broken away for clarity, of the guide means located in the broiler for slidingly mounting the food rack;

FIG. 5 is a perspective view of the food rack and door, certain parts being shown as broken away and in section for clarity;

FIG. 6 is a transverse, vertical cross-sectional view through the broiler; and

FIG. 7 is a longitudinal vertical cross-sectional view through the broiler.

DESCRIPTION OF THE PREFERRED EMBODIMENT

The food broiler made in accordance with the present invention includes an outer casing 1 and a broiling inner housing 2 rigidly supported within the casing. An opening 3 is formed in the front side of the casing and housing and this opening 3 is of a horizontally elongated shape which is relatively narrow in height. The housing defines an interior space which is the broiling chamber C. A series of ceramic mat burners 4 of the gas-fired type are mounted in the housing and are arranged in the well-known manner above and below the food rack R which supports the food to be broiled. As previously indicated, these burners are of the type shown in the said U.S. Pat. Nos. 2,997,941 and 3,267,924.

As the food is broiled, the fat drips down on the panels 5 located at the bottom of the chamber and inclined so that the grease falls in the removable fat pan 6. These inclined panels and fat pan are shown in the U.S. Pat. No. 3,413,911, granted Dec. 3, 1968 and entitled "Food Broiler," and in the U.S. Pat. No. 3,413,912, granted Dec. 3, 1968, entitled "Food Broiler."

The rack R, as clearly shown in FIG. 5, is composed of a series of parallel steel rods 8 which are rigidly secured together at the ends with side bars 9 and 10. The front ends of the side bars 9 and 10 are rigidly secured to the hollow door 12 and the rear ends of side bars 9 and 10 are rigidly secured by the cross brace 13. A pair of wheels 14 are rotatably mounted at the rear end of the rack and a pair of upstanding stops 15 are rigidly secured to the rear end of the rack. The front end of the rack, more particularly, the outside of the door has a handle 16 attached thereto and hook members 17 and 18 are secured, one at each side to the lower edge of the door 12. These hook members 17 and 18 have upwardly facing slots 19 for purposes that will appear.

A guide means G is provided in the chamber for slideably mounting the rack R in the chamber in a horizontal direction whereby the rack can be moved through the opening 3 between a position fully within the rack and a position fully outside the rack as shown in FIG. 3. This guide means G comprises a pair of spaced-apart channel members 20 and 21 which have their channels facing toward one another and which are rigidly secured together at their rear end by cross brace 23. Channels 20 and 21 are secured at their front end by the fabricated sheet metal member 24. The guide means has rollers 26 and 27, one mounted at each end of the member 24, more particularly, each one mounted on the channels 20 and 21 adjacent the front end thereof. The guide means is rigidly secured within the chamber as with sheet metal screws, by welding, or the like. In this manner, the wheels 14 of the rack set within the channel-shaped members 20 and 21 and roll therealong. The lower surface of the bars 9 and 10 ride on the top of the rollers 26 and 27, and thus the rack is smoothly movable in a horizontal direction into and out of the broiling chamber.

When the rack is fully within the chamber as shown in FIG. 1, the door completely seals the opening 3. When the door and rack are extended to a fully outward position as shown in FIG. 3, the stops 15 bear against the inwardly turned flanges 30 (FIG. 7) of the housing and casing.

A drip pan P is pivotally attached to the lower edge of the door 12, more specifically, pins 32 of the door rest in the upwardly facing openings 19 of the hook members 17 and 18. This pan is generally coextensive in width with the rack. The drip pan includes a lower drip edge 33. Connecting means 55 are provided for swingably supporting the pan on the broiler, whereby as the rack and door are moved horizontally, the pan swings and is always located beneath the rack to catch the grease dripping therefrom and further, so that the lower drip edge is always directly vertically above a receptacle 40 which is removably attached to the broiler as will appear. More specifically, the connecting means consists of a pair of links 55, one link attached to each side of the drip pan P, and these links 55 are also pivotally attached at their other ends to the broiler. For this purpose, brackets 57 and 58 are secured to the front side of the broiler, one on either side of the opening 3 and these brackets have open slots which receive the pins 59 of the links 55.

The links are attached to the pan by means of their keyhole slots 60 which slip over pins 61 located on the sides of the drip pan. It will thus be seen that the links 55 and the drip pan P can be quickly and easily detached from the door 12 and the broiler casing. Furthermore, the door and rack and be easily removed from the broiling chamber and completely from the casing so that all of the parts can be completely and easily cleaned. The receptacle 40 is removably mounted on the hooks 42 secured to the front side of the broiler and this receptacle 40 furthermore has a central opening 41 at its lower end from which extends a drain trough 44. This drain trough extends from the opening 41 and beneath the broiler. As shown in FIG. 7, a pail or the like 50 can then be positioned to catch the fat or other drippings that fall by gravity from the drain trough 44.

Referring again to the links 55 and the drip pan P, the length of the link 55 is approximately equal to the distance between the point of attachment of the pan to the door and the point of attachment of the link 55 to the pan as at 61.

It will be noted that in any positions of the door and rack as shown in FIGS. 1, 2, 3, or 7, the lower drip edge of the pan is always directly vertically above the receptacle 40 so that any fat dripping therefrom falls by gravity into the receptacle. When the door is fully shut as shown in FIG. 1, the drip pan lays flat against the front surface of the broiler in a compact position where the dirty surface of the pan is completely protected.

The elongated receptacle 40, if of sufficient size, need not have the opening 41 and drain trough 44, but instead can be removed more frequently for emptying.

I claim:

1. In a food broiler of the type having a broiling chamber and a side opening, a food rack slideably mounted in said chamber for sliding movement through said opening and between a position within said chamber and a position outside of said chamber, a door attached to said rack and which abuts against said opening to close the latter when said rack is in said chamber, the improvement comprising, a drip pan attached to said door and extending generally downwardly therefrom, said pan having a lower drip edge, a receptacle below said pan, and connecting means for also shiftably supporting said pan on said broiler whereby as said rack and door are moved generally horizontally, said pan moves bodily and is always beneath said rack to catch grease or the like dripping therefrom and whereby said lower edge of said pan moves in a substantially vertical position above said receptacle.

2. The broiler set forth in claim 1 further characterized in that said connecting means comprises a link pivotally attached to said pan and to said broiler, and the length of said link is approximately equal to the distance between the point of attachment of said pan to said door and the point of attachment of said link to said pan.

3. The broiler set forth in claim 1 further characterized in that said receptacle is removably attached to said broiler and has an opening in its lower side, and a drain trough extends from said opening and under said broiler.

4. The broiler set forth in claim 2 further characterized in that said receptacle is removably attached to said broiler and has an opening in its lower side, and a drain trough extends from said opening and under said broiler.

5. A food broiler comprising, a broiling chamber and a horizontally elongated side opening, a food rack slideably mounted in said chamber for horizontal sliding movement through said opening and between a position within said chamber and a position outside of said chamber, a door attached to said rack and which abuts against said opening to close the latter when said rack is in said chamber, a drip pan pivotally attached to said door and generally coextensive in width with said rack, said pan having a lower edge from which grease or the like can drip, a receptacle below said pan, and connecting means for swingably supporting said pan on said broiler whereby as said rack and door are moved horizontally, said pan swings and is always beneath said rack to catch grease or the like dripping therefrom and whereby said lower edge of said pan moves in a substantially vertical position above said receptacle.

6. The broiler set forth in claim 5 further characterized in that said connecting means comprises a link pivotally attached to said pan and to said broiler, and the length of said link is approximately equal to the distance between the point of attachment of said pan to said door and the point of attachment of said link to said pan.

7. The broiler set forth in claim 5 further characterized in that said receptacle is removably attached to said broiler and has an opening in its lower side, and a drain trough extends from said opening and under said broiler.

8. The broiler set forth in claim 6 further characterized in that said receptacle is removably attached to said broiler and has an opening in its lower side, and a drain trough extends from said opening and under said broiler.

9. In a food broiler of the type having a broiling chamber and a horizontally elongated side opening of relatively narrow height, a food rack formed of spaced-apart rods to provide an open rack, guide means in said chamber for slideably mounting said rack in said chamber for horizontal sliding movement through said opening and between a position within said chamber and a position outside of said chamber, heating units in said chamber and located above and below said open rack, a door attached to said rack at one side thereof and which door abuts against said opening to close the latter when said rack in in said chamber, a drip pan pivotally attached to said door and coextensive in width with said open rack to catch grease or the like dripping therefrom, said pan having a lower drip edge, a receptacle removably mounted on said broiler and below said pan, and link means for swingably supporting said pan on said broiler whereby as said rack and door are moved horizontally, said pan swings and is always beneath said open rack to catch grease or the like dripping therefrom and whereby said lower edge of said pan moves in a substantially vertical position above said receptacle.

10. The broiler set forth in claim 9 further characterized in that said link means is pivotally attached to said pan and said broiler and the length of said link means is approximately equal to the distance between the point of attachment of said pan to said door and the point of attachment of said link to said pan.

11. A broiler of the type set forth in claim 9 further characterized in that said rack is easily removable from said guide means and said link means is quickly attachable from said pan and broiler.

12. A broiler as set forth in claim 9 further characterized in that said receptacle has an opening in its lower side, and a drain trough extends from said opening and beneath said broiler.

13. A broiler as set forth in claim 10 further characterized in that said receptacle has an opening in its lower side and a drain trough extends from said opening and beneath said broiler.

14. A broiler as set forth in claim 11 further characterized in that said receptacle has an opening in its lower side and a drain trough extends from said opening and beneath said broiler.

15. A broiler of the type set forth in claim 10 further characterized in that said rack is easily removable from said guide means and said link means is quickly detachable from said pan and broiler.

16. In combination, a food broiler of the type having a broiling chamber and a horizontally elongated side opening of relatively narrow height, a food rack slideably mounted in said chamber for horizontal sliding movement through said opening and between a position within said chamber and a position outside of said chamber, a door attached to said rack at one side thereof and which abuts against said opening to close the latter when said rack is in said chamber, a drip pan pivotally attached to said door and coextensive in width with said rack, said pan having a lower edge from which grease or the like can drip, an elongated receptacle removably mounted on said broiler and below said pan, and link means for pivotally and swingably supporting said pan on said broiler whereby as said rack and door are moved horizontally, said pan swings and is always beneath said rack to catch grease or the like dripping therefrom and whereby said lower edge of said pan moves in a substantially vertical position above said receptacle to be in continual gravity feeding relationship therewith.

17. The broiler set forth in claim 16 further characterized in that said link means is pivotally attached to said pan and said broiler and the length of said link means is approximately equal to the distance between the point of attachment of said pan to said door and the point of attachment of said link to said pan.

18. A broiler of the type set forth in claim 16 further characterized in that said rack is easily removable from said guide means and said link means is quickly attachable from said pan and broiler.

19. The broiler set forth in claim 18 further characterized in that said link means is pivotally attached to said pan and said broiler and the length of said link means is approximately equal to the distance between the point of attachment of said pan to said door and the point of attachment of said link to said pan.